(12) United States Patent
Ukai

(10) Patent No.: US 10,544,514 B2
(45) Date of Patent: Jan. 28, 2020

(54) GAS DIFFUSION DEVICE AND ELECTROCHEMICAL HYDROGEN PUMP

(71) Applicant: Panasonic Intellectual Property Management Co., Ltd., Osaka (JP)

(72) Inventor: Kunihiro Ukai, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 126 days.

(21) Appl. No.: 15/713,605

(22) Filed: Sep. 23, 2017

(65) Prior Publication Data

US 2018/0094356 A1    Apr. 5, 2018

(30) Foreign Application Priority Data

Oct. 5, 2016  (JP) .................................. 2016-197310

(51) Int. Cl.
  *C25B 11/03*   (2006.01)
  *C25B 1/10*    (2006.01)
  *C25B 9/10*    (2006.01)

(52) U.S. Cl.
  CPC ............. *C25B 11/035* (2013.01); *C25B 1/10* (2013.01); *C25B 9/10* (2013.01)

(58) Field of Classification Search
  None
  See application file for complete search history.

(56) References Cited

U.S. PATENT DOCUMENTS

| 5,316,644 | A  |    | 5/1994  | Titterington et al. |
| 6,171,719 | B1 |    | 1/2001  | Roy et al. |
| 8,551,670 | B2 | *  | 10/2013 | Mittelsteadt ............... C25B 9/10 |
|           |    |    |         | 429/457 |
| 2003/0062268 | A1 | * | 4/2003 | Kosek ....................... C25B 1/04 |
|           |    |    |         | 205/637 |
| 2004/0142215 | A1 | * | 7/2004 | Barbir ............... H01M 8/04089 |
|           |    |    |         | 429/411 |
| 2005/0133364 | A1 |   | 6/2005 | Leonida |

FOREIGN PATENT DOCUMENTS

| FR | 3016084 A1 | 7/2015 |
| JP | 2005-179780 | 7/2005 |
| JP | 2006-070322 | 3/2006 |
| JP | 2011-044297 A | 3/2011 |
| WO | WO 2015/101924 A1 * | 7/2015 ............. C25B 13/02 |

OTHER PUBLICATIONS

Machine translation of WO2015/101924, corresponding to FR 3016084, obtained at http://worldwide.espacenet.com on Mar. 26, 2019 (Year: 2015).*
The Extended European Search Report dated Nov. 30, 2017 for the related European Patent Application No. 17193656.0.

* cited by examiner

*Primary Examiner* — Harry D Wilkins, III
(74) *Attorney, Agent, or Firm* — McDermott Will & Emery LLP

(57) ABSTRACT

A gas diffusion device includes a first gas diffusion layer that diffuses gas and is formed of metal and at least one first metal plate that is provided on at least one main surface of the first gas diffusion layer and includes a manifold hole through which gas flows and a gas flow path which communicates with the manifold hole, and the gas flow path passes through the first metal plate.

13 Claims, 9 Drawing Sheets

GAS DIFFUSION DEVICE AND ELECTROCHEMICAL HYDROGEN PUMP

BACKGROUND

1. Technical Field

The present disclosure relates to a gas diffusion device and an electrochemical hydrogen pump.

2. Description of the Related Art

In recent years, hydrogen has been attracting attention as clean alternative energy resources that replace fossil fuels in view of environmental problems such as global warning and energy problems such as exhaustion of oil resources. Basically only water is emitted in a case where hydrogen is combusted, carbon dioxide as a cause of global warming is not discharged, and nitrogen oxides or the like is hardly discharged. Thus, hydrogen is expected as clean energy. Further, an example of an apparatus that highly efficiently uses hydrogen as a fuel is a fuel cell. Development and popularization of the fuel cell have been progressing for vehicle power sources and household power generation.

In a hydrogen-based society in the future, it is desired to develop techniques in which in addition to production of hydrogen, hydrogen gas may be stored at high density and transported or used by a small capacity and low cost. Particularly, a fuel supply infrastructure has to be built for promotion of popularization of the fuel cells as distributed energy sources. Further, in order to stably supply hydrogen to the fuel supply infrastructure, various suggestions for refinement and pressurization of high purity hydrogen gas have been made.

For example, Japanese Unexamined Patent Application Publication No. 2005-179780 discloses a high-pressure hydrogen production apparatus in which a gas flow path for supplying gas to an electrolyte membrane via a gas diffusion layer is provided to a separator plate in a groove-like manner. Further, Japanese Unexamined Patent Application Publication No. 2005-179780 discloses a pressing section that may press a cathode feeder to a solid polymer membrane and cause the cathode feeder to tightly contact with the solid polymer membrane so that a contact resistance between the electrolyte membrane and the cathode feeder does not increase even in a case where the cathode side is at a high voltage.

In Japanese Unexamined Patent Application Publication No. 2006-70322, a support member of an electrolyte membrane of a high differential pressure electrochemical cell is used as a gas diffusion layer that contacts with the electrolyte membrane. That is, plural rectangular groove portions are formed in one surface of the support member, and plural rhombus groove portions are formed in the other surface. Further, a superposed portion of both of the groove portions configures a gas flow path through which gas passes. Accordingly, clogging of a fluid flow path that may occur in a gas diffusion layer of a mesh type in related art may be inhibited, and rigidity that may stand the differential pressure between a high pressure side and a low pressure side of the electrochemical cell may be secured. Thus, deformation that reaches the failure point of the electrolyte membrane is inhibited by support by the support member.

SUMMARY

However, in related art, a problem in a case where a process for a gas flow path is applied to a flow path member in order to deliver gas to an electrolyte membrane has not sufficiently been discussed.

One non-limiting and exemplary embodiment provides a gas diffusion device in which a gas flow path may appropriately be provided to a metal plate without performing a grooving process and a bending process. Further, one non-limiting and exemplary embodiment provides an electrochemical hydrogen pump that includes such a gas diffusion device.

In one general aspect, the techniques disclosed here feature a gas diffusion device including: a first gas diffusion layer that diffuses gas and is formed of metal; and at least one first metal plate that is provided on at least one main surface of the first gas diffusion layer and includes a manifold hole through which gas flows and a gas flow path which communicates with the manifold hole, in which the gas flow path passes through the first metal plate.

The gas diffusion device of one aspect of the present disclosure provides an effect in which a gas flow path may appropriately be provided to a metal plate without performing a grooving process and a bending process.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

First Embodiment

Figure 1A:
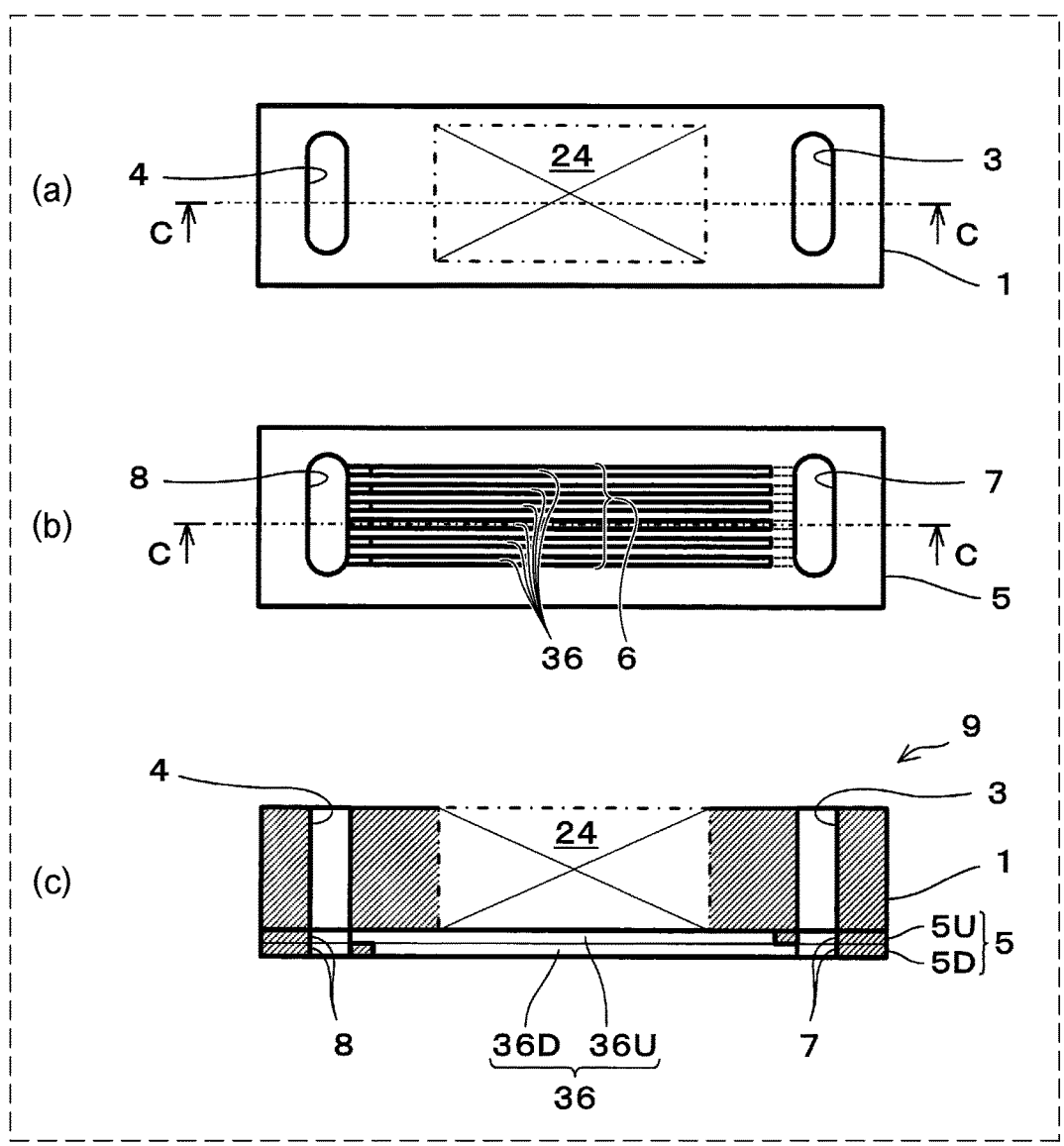
FIG. 1A is a diagram that illustrates one example of a gas diffusion device of a first embodiment.

Intensive studies were conducted about a process for a gas flow path that is applied to a metal plate for delivering gas to an electrolyte membrane, and the following knowledge was obtained.

For example, a bending process for providing a step in a thin metal plate may form the gas flow path to the metal plate. However, in this case, when a high pressure is exerted on a gas diffusion layer, the metal plate that supports the gas diffusion layer is likely to deform. Further, for example, in a case where a process for forming a groove in a flow path member is performed as in related art, the flow path member requests a prescribed thickness. That is, it is difficult to apply a uniform grooving process for the gas flow path to the thin metal plate. Thus, in an apparatus in related art, size reduction of a device may be limited. Accordingly, the inventor has reached a conception of configuring the gas flow path with a through hole that passes through the metal plate.

That is, a gas diffusion device of a first embodiment includes: a first gas diffusion layer that diffuses gas and is formed of metal; and at least one first metal plate that is provided on at least one main surface of the first gas diffusion layer and includes a manifold hole through which gas flows and a gas flow path which communicates with the manifold hole, in which the gas flow path passes through the first metal plate.

In such a configuration, the gas diffusion device of this embodiment may appropriately provide a gas flow path to a metal plate without performing a grooving process and a bending process. That is, compared to a case where the gas flow path is formed to the metal plate by the bending process for providing a step in the metal plate, the deformation amount of the gas diffusion device may be reduced even in a case where a high pressure is exerted on the gas diffusion layer. Further, the gas flow path may appropriately be provided to a metal plate with a thinner thickness than a flow path member in which the gas flow path is processed to have a groove.

As described above, in the gas diffusion device of this embodiment, while gas distribution performance to the gas diffusion layer is appropriately secured, the metal plate may appropriately inhibit deformation of the device even in a case where a high pressure is exerted on the gas diffusion layer.

A specific example of the first embodiment will hereinafter be described with reference to attached drawings.

The specific example described below represents one example of the first embodiment. Thus, values, shapes, materials, configuration elements, arrangement positions and connection manners of configuration elements, and so forth that are described in the following do not limit the above first embodiment unless those are described in claims (the same applies to the other embodiments). Further, the configuration elements that are not described in the independent claims which provide the most superordinate concepts among the configuration elements in the following will be described as arbitrary configuration elements. Further, the elements to which the same reference characters are given in the drawings may not be described. Further, the drawings schematically illustrate the configuration elements for easy understanding. Shapes, dimension ratios, and so forth may not accurately be depicted.

Apparatus Configuration

FIG. 1A is a diagram that illustrates one example of the gas diffusion device of the first embodiment. FIG. 1A(a) is a diagram of a first gas diffusion layer 1 of a gas diffusion device 9 in a planar view. FIG. 1A(b) is a diagram of a first metal plate 5 of the gas diffusion device 9 in a planar view.

FIG. 1A(c) is a cross-sectional diagram of the gas diffusion device 9. That is, FIG. 1A(c) illustrates the cross section of the gas diffusion device 9 that corresponds to C-C part in a case where members that are illustrated in FIG. 1A(a) and FIG. 1A(b) in a planar view are laminated.

As illustrated in FIG. 1A(c), the gas diffusion device 9 includes the first gas diffusion layer 1 and the first metal plate 5.

The first gas diffusion layer 1 is a metal member that diffuses gas. The first gas diffusion layer 1 may be in any configuration as long as the first gas diffusion layer 1 is a metal member that diffuses gas. The first gas diffusion layer 1 may be configured with metal such as stainless steel, titanium, a titanium alloy, or an aluminum alloy, for example. The thickness of the first gas diffusion layer 1 may be approximately several hundred μm (for example, approximately 400 μm). Those materials and values are examples, and embodiments are not limited to those examples.

As illustrated in FIG. 1A(a) and FIG. 1A(c), the first gas diffusion layer 1 includes a gas diffuser 24 and manifold hole 3 and manifold hole 4 through which gas flows. The gas diffuser 24 is configured to diffuse gas by a porous structure such as through holes. Details will be described in a second embodiment.

The first metal plate 5 is provided on at least one main surface of the first gas diffusion layer 1. In the gas diffusion device 9 of this embodiment, the first metal plate 5 is provided to make surface contact with one main surface of the first gas diffusion layer 1. The first metal plate 5 may be a metal steel plate. As a material of the first metal plate 5, stainless steel, titanium, a titanium alloy, an aluminum alloy, or the like may be used, for example. The thickness of the first metal plate 5 may be approximately several ten μm (for example, approximately 50 μm). Those materials and values are examples, and embodiments are not limited to those examples.

As illustrated in FIG. 1A(b) and FIG. 1A(c), the first metal plate 5 includes a manifold hole 7 for gas introduction, a manifold hole 8 for leading gas out, and a gas flow path 6.

The manifold hole 7 and the manifold hole 8 are arranged to be respectively opposed to the manifold hole 3 and the manifold hole 4 of the first gas diffusion layer 1.

That is, a tubular gas introduction manifold of the gas diffusion device 9 is formed with the manifold hole 7 and the manifold hole 3. A tubular gas lead-out manifold of the gas diffusion device 9 is formed with the manifold hole 8 and the manifold hole 4.

The gas flow path 6 communicates with the manifold holes of the first metal plate 5. Further, the gas flow path 6 passes through the first metal plate 5. The gas flow path 6 may be in any configuration as long as the gas flow path 6 communicates with the manifold holes of the first metal plate 5 and passes through the first metal plate 5.

In the gas diffusion device 9 of this embodiment, the gas flow path 6 of the first metal plate 5 is configured with plural slit holes 36D that communicate with the manifold hole 7 and linearly extend toward the manifold hole 8 but are not connected with the manifold hole 8 and plural slit holes 36U that communicate with the manifold hole 8 and linearly extend toward the manifold hole 7 but do not communicate with the manifold hole 7. That is, the first metal plate 5 is formed by integrally joining a first metal layer 5D that includes the slit holes 36D and a second metal layer 5U that includes the slit holes 36U such that those slit holes 36D and slit holes 36U overlap with each other. Further, a portion in which the slit holes 36D and the slit holes 36U overlap with each other configures slit holes 36 of the gas flow path 6 that passes through the first metal plate 5. In this case, the manifold hole 7 communicates with a plurality of one ends of the gas flow path 6 and is thereby used for gas introduction to the gas diffuser 24. That is, the gas that passes through a contact portion between the slit holes 36 of the gas flow path 6 and the gas diffuser 24 is delivered to the gas diffuser 24. Further, the manifold hole 8 communicates with a plurality of the other ends of the gas flow path 6 and is thereby used for leading gas out from the gas diffuser 24. That is, excess gas that passes through the gas diffuser 24 is delivered to the contact portion between the slit holes 36 of the gas flow path 6 and the gas diffuser 24.

Although not illustrated in FIG. 1A, in the gas diffusion device 9 of this embodiment, a metal member for blocking the slit holes 36 is arranged on a main surface of the first metal plate 5 that does not face the first gas diffusion layer 1. Such a metal member may be a second metal plate 10, which will be described in an example.

Action

In the following, one example of an action of the gas diffusion device 9 of the first embodiment will be described with reference to FIG. 1A. Note that a portion of or the whole following action may be performed by a control program of a controller, which is not illustrated. The controller may be in any configuration as long as the controller has a control function. The controller includes an arithmetic circuit and a storage circuit that stores the control program, for example. Examples of the arithmetic circuit may include an MPU, a CPU, and so forth, for example. Examples of the storage circuit may include a memory, for example. The controller may be configured with a single controller that performs centralized control or may be configured with plural controllers that mutually and cooperatively perform distributed control.

First, gas is supplied from the outside to the manifold hole 7. Then, because the manifold hole 7 communicates with one ends of the gas flow path 6 of the first metal plate 5, gas is delivered from the manifold hole 7 to the gas flow path 6.

Here, a portion of the gas that flows through the gas flow path 6 is delivered to the gas diffuser 24 of the first gas diffusion layer 1. The gas diffuser 24 includes a gas diffusion function, which will be described in the second embodiment. Thus, the gas that flows from the gas flow path 6 toward the main surface (hereinafter referred to as an opposite surface) of the gas diffuser 24 which does not face the first metal plate 5 may pass through the opposite surface of the gas diffuser 24 while being uniformly diffused by the gas diffuser 24. Accordingly, gas is uniformly supplied to members that are arranged on the opposite surface of the gas diffuser 24 and are not illustrated (for example, a catalyst layer and so forth).

Excess gas that does not pass through the opposite surface of the gas diffuser 24 is delivered to the manifold hole 8 that communicates with the other ends of the gas flow path 6 of the first metal plate 5 and is discharged to the outside.

As described above, the gas diffusion device 9 of this embodiment may appropriately provide the gas flow path 6 to the first metal plate 5 without performing a grooving process and a bending process. That is, compared to a case where the gas flow path is formed to the metal plate by the bending process for providing a step in the metal plate, the deformation amount of the gas diffusion device 9 may be reduced even in a case where a high pressure is exerted on the first gas diffusion layer 1. Further, the gas flow path 6 may appropriately be provided to the first metal plate 5 with a thinner thickness than a flow path member in which the gas flow path is processed to have a groove.

Thus, in the gas diffusion device 9, while gas distribution performance to the first gas diffusion layer 1 is appropriately secured, the first metal plate 5 may appropriately inhibit deformation of the device even in a case where a high pressure is exerted on the first gas diffusion layer 1. Specifically, in the gas diffusion device 9, the first metal plate 5 that includes the gas flow path 6 which communicates with the manifold hole 7 and the manifold hole 8 is laminated to the first gas diffusion layer 1, and distribution performance of gas to the gas diffuser 24 of the first gas diffusion layer 1 is thereby secured. Further, appropriate rigidity of the gas diffusion device 9 may be obtained by the lamination of the first gas diffusion layer 1 and the first metal plate 5, and deformation of the gas diffusion device 9 may thereby be inhibited even in a case where a high pressure is exerted on the first gas diffusion layer 1.

Further, in the gas diffusion device 9 of this embodiment, the first metal plate 5 and the first gas diffusion layer 1 may be integrally bonded by metal joining by welding, soldering, deposition, or the like. For example, the gas diffusion device 9 may be a joined metal body with a thickness of approximately 2 mm or thinner. This value is an example, and embodiments are not limited to this example.

Hypothetically, in a case where the first metal plate 5 and the first gas diffusion layer 1 are not integrally configured and where a high pressure is exerted on the first gas diffusion layer 1, the first gas diffusion layer 1 may be displaced from end portions of the slit holes 36 in a state where the first gas diffusion layer 1 abutted the end portions of the slit holes 36. In this case, damage to the first gas diffusion layer 1 would possibly occur. However, in the gas diffusion device 9 of this embodiment, the above integral joining between the first metal plate 5 and the first gas diffusion layer 1 may reduce such a possibility.

Further, in the gas diffusion device 9 of this embodiment, for example, surface joining by diffusion joining or the like may be performed between the main surface of the first metal plate 5 and the main surface of the first gas diffusion layer 1. Accordingly, compared to a case where the first metal plate 5 is laminated to the first gas diffusion layer 1 by fixing by a mechanical fastening member, a gap does not remain in the joining portion between both of those, and the contact resistance (electric resistance) of the gas diffusion device 9 may thus be reduced. Then, for example, in a case where the gas diffusion device 9 is used for an electrochemical hydrogen pump or the like and a desired voltage is applied to the gas diffusion device 9, an increase in power consumption that is requested for the electrochemical hydrogen pump may be inhibited.

Modification Example

Figure 1B:
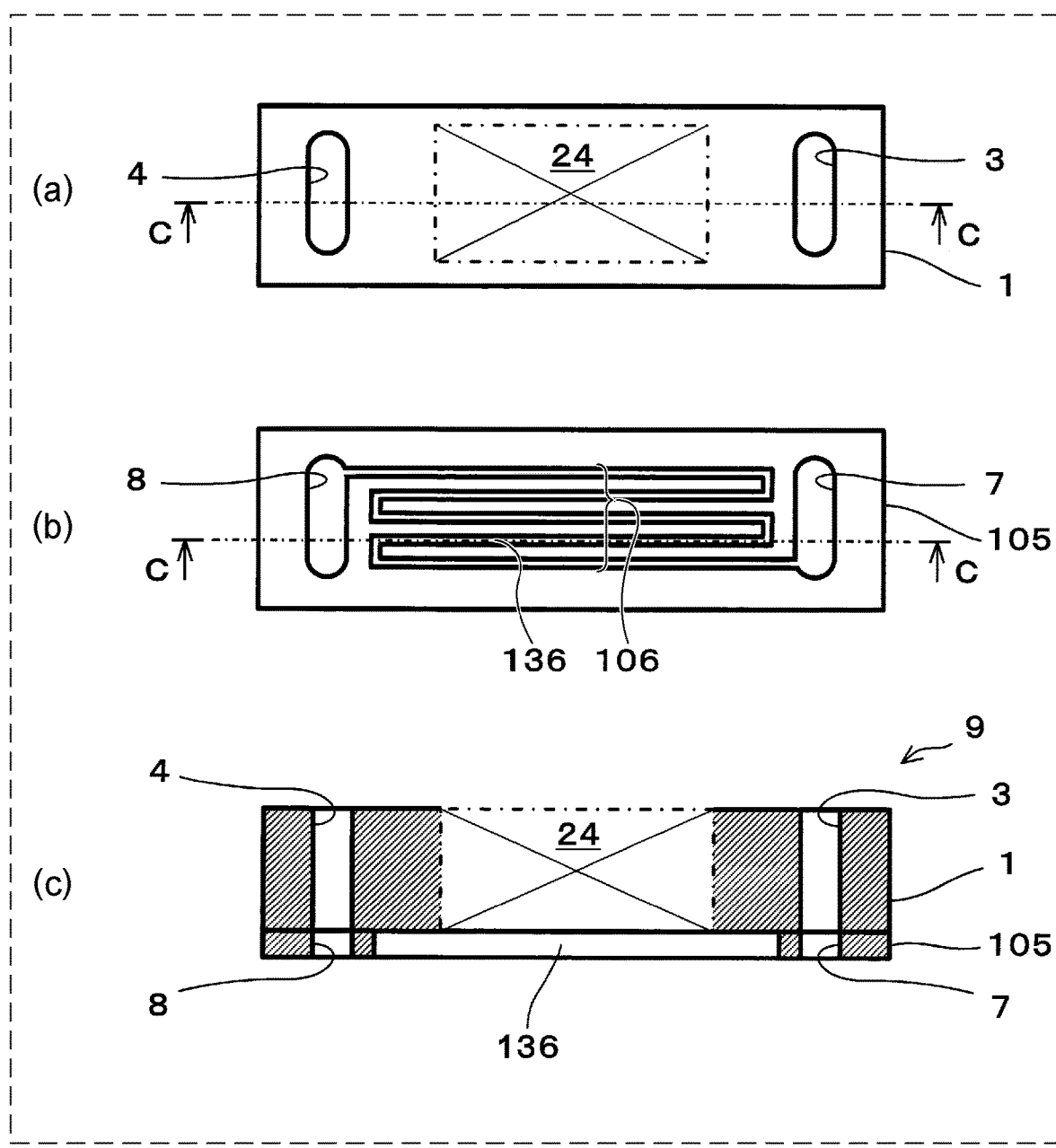
FIG. 1B is a diagram that illustrates one example of the gas diffusion device of a modification example of the first embodiment.

FIG. 1B is a diagram that illustrates one example of the gas diffusion device of a modification example of the first embodiment. FIG. 1B(a) is a diagram of the first gas diffusion layer 1 of the gas diffusion device 9 in a planar view. FIG. 1B(b) is a diagram of a first metal plate 105 of the gas diffusion device 9 in a planar view. FIG. 1B(c) is a cross-sectional diagram of the gas diffusion device 9. That is, FIG. 1B(c) illustrates the cross section of the gas diffusion device 9 that corresponds to C-C part in a case where members that are illustrated in FIG. 1B(a) and FIG. 1B(b) in a planar view are laminated.

As illustrated in FIG. 1B(c), the gas diffusion device 9 includes the first gas diffusion layer 1 and the first metal plate 105. The first gas diffusion layer 1 is similar to the gas diffusion device 9 of the first embodiment, and a description will thus not be made.

The first metal plate 105 is provided on at least one main surface of the first gas diffusion layer 1. In the gas diffusion device 9 of this modification example, the first metal plate 105 is provided to make surface contact with one main surface of the first gas diffusion layer 1. The first metal plate 105 may be a metal steel plate. As a material of the first metal plate 105, stainless steel, titanium, a titanium alloy, an aluminum alloy, or the like may be used, for example. The thickness of the first metal plate 105 may be approximately several ten µm (for example, approximately 50 µm). Those materials and values are examples, and embodiments are not limited to those examples.

As illustrated in FIG. 1B(b) and FIG. 1B(c), the first metal plate 105 includes the manifold hole 7 for gas introduction, the manifold hole 8 for leading gas out, and a gas flow path 106.

The manifold hole 7 and the manifold hole 8 are arranged to be respectively opposed to the manifold hole 3 and the manifold hole 4 of the first gas diffusion layer 1.

That is, a tubular gas introduction manifold of the gas diffusion device 9 is formed with the manifold hole 7 and the manifold hole 3. A tubular gas lead-out manifold of the gas diffusion device 9 is formed with the manifold hole 8 and the manifold hole 4.

The gas flow path 106 communicates with the manifold holes of the first metal plate 105. Further, the gas flow path 106 passes through the first metal plate 105. The gas flow path 106 may be in any configuration as long as the gas flow path 106 communicates with the manifold holes of the first metal plate 105 and passes through the first metal plate 105.

In the gas diffusion device 9 of this modification example, the gas flow path 106 of the first metal plate 105 is configured with a slit hole 136 that extends in a serpentine-like manner in a region between the manifold hole 7 and the manifold hole 8. One end of the slit hole 136 communicates with the manifold hole 7, and the other end communicates with the manifold hole 8. Accordingly, because plural metal layers do not have to be integrally joined, the first metal plate 105 may be configured with one metal layer. In this case, the manifold hole 7 communicates with one end of the gas flow path 106 and is thereby used for gas introduction to the gas diffuser 24. That is, the gas that passes through a contact portion between the slit hole 136 of the gas flow path 106 and the gas diffuser 24 is delivered to the gas diffuser 24. Further, the manifold hole 8 communicates with the other end of the gas flow path 106 and is thereby used for leading gas out from the gas diffuser 24. That is, excess gas that passes through the gas diffuser 24 is delivered to the contact portion between the slit hole 136 of the gas flow path 106 and the gas diffuser 24.

Note that the action of the gas diffusion device 9 of this modification example and the work and effect thereof are similar to the gas diffusion device 9 of the first embodiment, and a description will thus not be made.

Further, except for the above features, the gas diffusion device 9 of this modification example may be similar to the gas diffusion device 9 of the first embodiment.

Example

Figure 2:
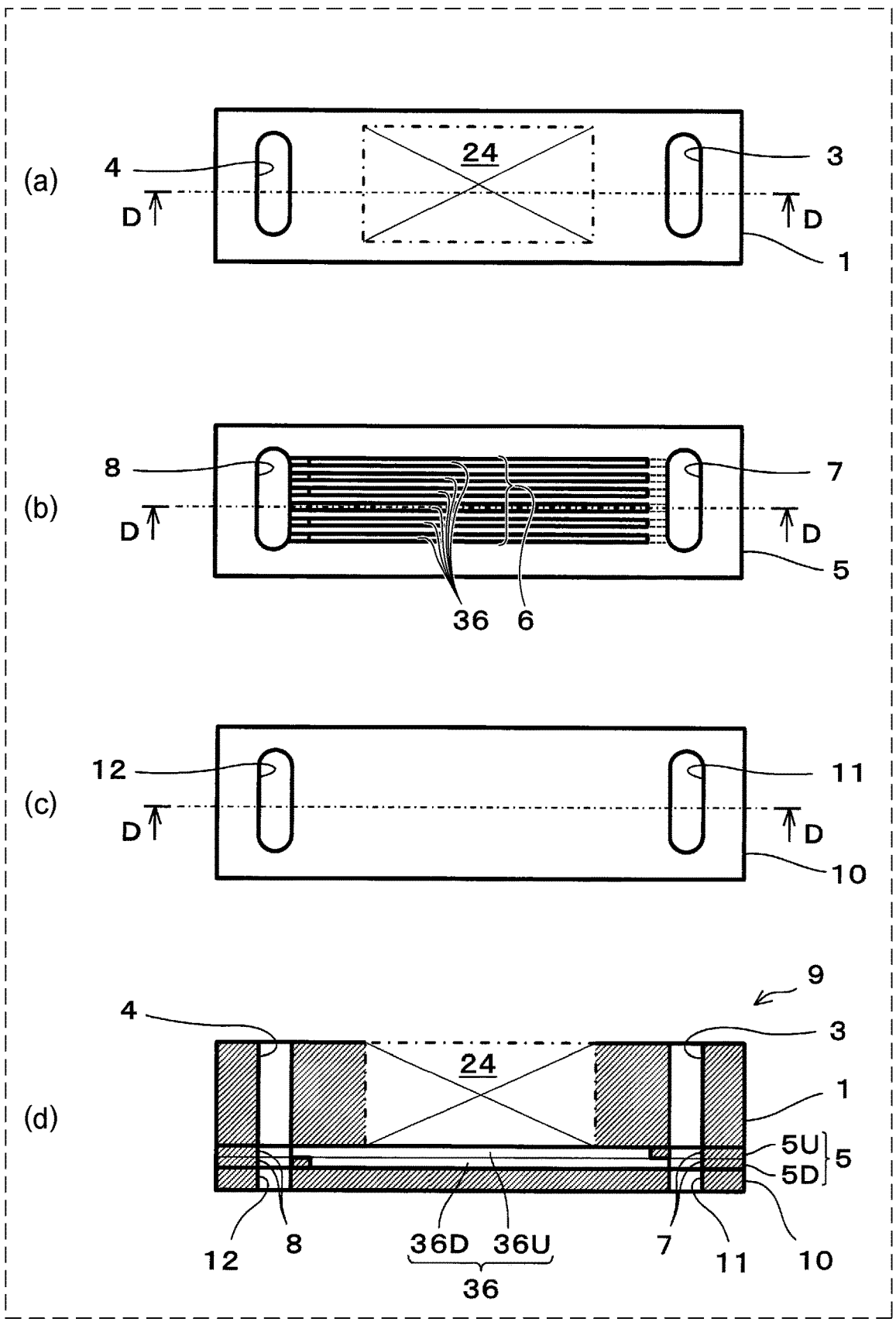
FIG. 2 is a diagram that illustrates one example of the gas diffusion device of an example of the first embodiment.

FIG. 2 is a diagram that illustrates one example of the gas diffusion device of an example of the first embodiment. FIG. 2(a) is a diagram of the first gas diffusion layer 1 of the gas diffusion device 9 in a planar view. FIG. 2(b) is a diagram of the first metal plate 5 of the gas diffusion device 9 in a planar view. FIG. 2(c) is a diagram of a second metal plate 10 of the gas diffusion device 9 in a planar view.

FIG. 2(d) is a cross-sectional diagram of the gas diffusion device 9. That is, FIG. 2(d) illustrates the cross section of the gas diffusion device 9 that corresponds to D-D part in a case where members that are illustrated in FIG. 2(a), FIG. 2(b), and FIG. 2(c) in a planar view are laminated.

In the example illustrated in FIG. 2, the gas diffusion device 9 includes the first gas diffusion layer 1, the first metal plate 5, and the second metal plate 10. The first gas diffusion layer 1 and the first metal plate 5 are similar to the gas diffusion device 9 of the first embodiment, and a description will thus not be made. Although FIG. 2 illustrates a configuration in which the second metal plate 10 is provided to the gas diffusion device 9 of FIG. 1A, the second metal plate 10 may be provided to the gas diffusion device 9 of FIG. 1B.

In the gas diffusion device 9 of the first embodiment, the gas diffusion device 9 of this example includes the second metal plate 10 that blocks the gas flow path 6 of the first gas diffusion layer 1 on the main surface (hereinafter referred to as an opposite surface) that does not face the first gas diffusion layer 1 of the main surfaces of the first metal plate 5. Specifically, the plural slit holes 36 of the first metal plate 5 are covered from the opposite surface by the second metal plate 10.

Further, the second metal plate 10 includes a manifold hole 11 for gas introduction and a manifold hole 12 for leading gas out. The manifold hole 11 and the manifold hole 12 of the second metal plate 10 are arranged to be respectively opposed to the manifold hole 7 and the manifold hole 8 of the first metal plate 5.

That is, a tubular gas introduction manifold of the gas diffusion device 9 is formed with the manifold hole 11, the manifold hole 7, and the manifold hole 3. A tubular gas lead-out manifold of the gas diffusion device 9 is formed with the manifold hole 12, the manifold hole 8, and the manifold hole 4.

As a material of the second metal plate 10, stainless steel, titanium, a titanium alloy, an aluminum alloy, or the like may be used, for example. The thickness of the second metal plate 10 may be approximately several ten µm (for example, approximately 50 µm). Those materials and values are examples, and embodiments are not limited to those examples.

As described above, in the gas diffusion device 9 of this example, the second metal plate 10 appropriately inhibits the gas which flow through the gas flow path 6 from leaking from the opposite surface of the first metal plate 5 to the outside.

Further, in the gas diffusion device 9 of this example, the second metal plate 10, the first metal plate 5, and the first gas diffusion layer 1 may be integrally bonded by metal joining by welding, soldering, deposition, or the like. For example, surface joining by diffusion joining or the like may be performed for a main surface of the second metal plate 10, the main surface of the first metal plate 5, and the main surface of the first gas diffusion layer 1. Accordingly, compared to a case where the second metal plate 10, the first metal plate 5, and the first gas diffusion layer 1 are laminated by fixing by a mechanical fastening member, gaps do not remain in the respective joining portions, and the contact resistance (electric resistance) of the gas diffusion device 9 may thus be reduced. Then, for example, in a case where the gas diffusion device 9 is used for the electrochemical hydrogen pump or the like and a desired voltage is applied to the gas diffusion device 9, an increase in power consumption that is requested for the electrochemical hydrogen pump may be inhibited.

Except for the above features, the gas diffusion device 9 of this example may be similar to the gas diffusion device 9 of the first embodiment or the modification example of the first embodiment.

Second Embodiment

Figure 3A:
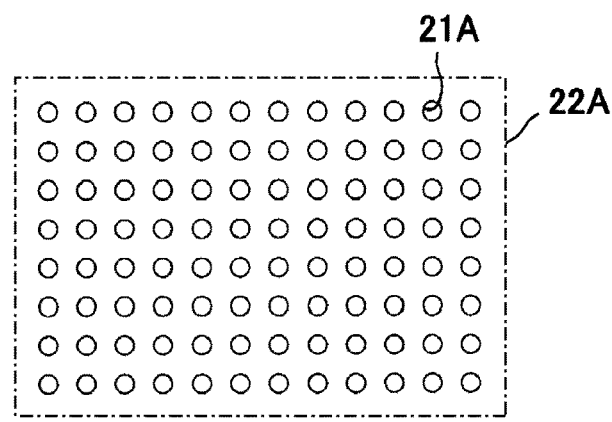
FIG. 3A is a diagram that illustrates one example of a layer of a laminated body that configures a gas diffuser in the gas diffusion device of a second embodiment in a planar view.
Figure 3B:
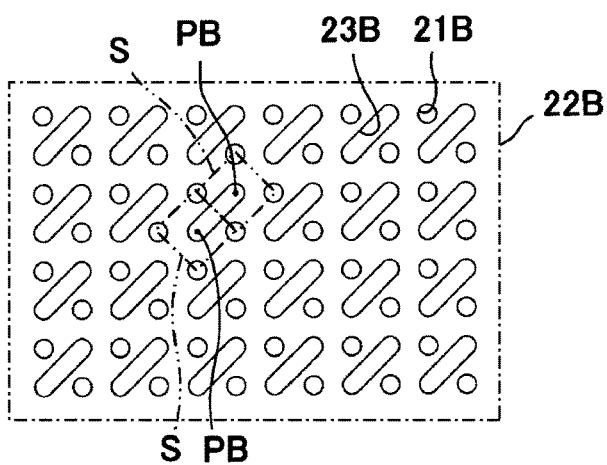
FIG. 3B is a diagram that illustrates one example of a layer of the laminated body that configures the gas diffuser in the gas diffusion device of the second embodiment in a planar view.
Figure 3C:
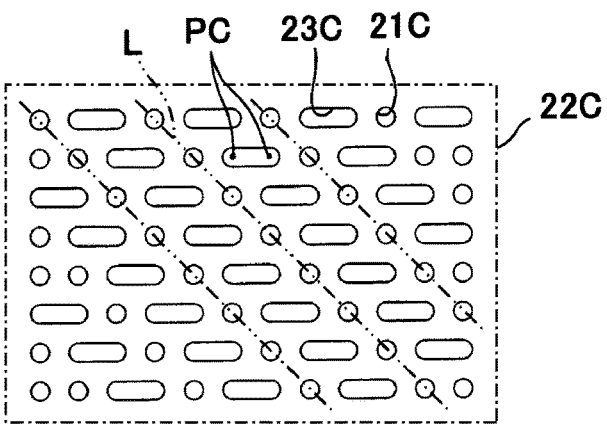
FIG. 3C is a diagram that illustrates one example of a layer of the laminated body that configures the gas diffuser in the gas diffusion device of the second embodiment in a planar view.
Figure 3D:
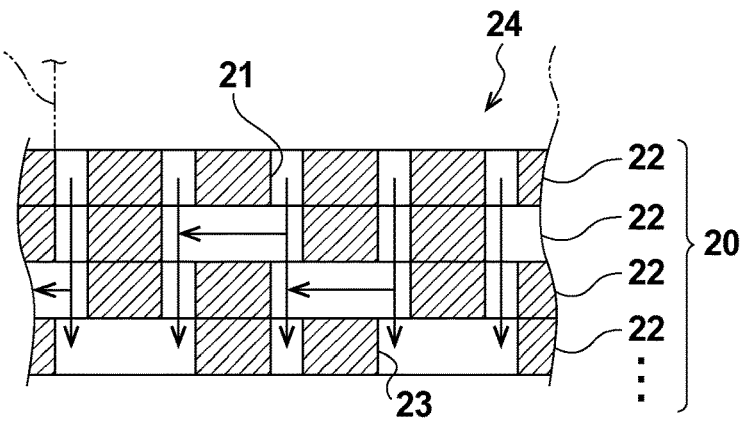
FIG. 3D is a diagram that illustrates one example of a cross section of the gas diffuser in the gas diffusion device of the second embodiment.

FIG. 3D is a diagram that illustrates one example of a cross section of the gas diffuser in the gas diffusion device of the second embodiment. FIG. 3A, FIG. 3B, and FIG. 3C are diagrams that illustrate examples of a layer of a laminated body that configures the gas diffuser in the gas diffusion device of the second embodiment in a planar view.

As for the gas diffusion device 9 of this embodiment, in the gas diffusion device 9 of the first embodiment or the example of the first embodiment, the first gas diffusion layer 1 includes a laminated body 20 of metal plates that have plural through holes 21.

Specifically, as illustrated in FIG. 3D, the laminated body 20 includes layers 22 that have plural through holes 21 through which gas passes. Further, at least one layer 22 of the laminated body 20 has an interconnection path 23 that interconnects the through holes 21. The laminated body 20 may be in any configuration as long as the laminated body 20 includes the layers 22 that have plural through holes 21 and at least one layer 22 of the laminated body 20 has the interconnection path 23 that interconnects the through holes 21.

In the example illustrated in FIG. 3D, the laminated body 20 is provided with the through holes 21 and both end portions of the interconnection path 23 that configure a gas flow path (hereinafter referred to as a reference gas flow path) that extend in the direction to pass through the laminated body 20 and the interconnection path 23 that configures a gas flow path which extends in a parallel direction with a main surface of the laminated body 20 so as to branch from the reference gas flow path and reach the next reference gas flow path. Accordingly, the interconnection path 23 interconnects the through holes 21 of the layer 22 that neighbors the layer 22 in which the interconnection path 23 is provided.

Another example of the gas diffuser 24 will be described in a modification example.

In a planar view of such a laminated body 20, for example, as illustrated in FIG. 3A, plural through holes 21A may be formed in a rectangular metal plate 22A that configures the layer 22 of the laminated body 20 at regular pitches in the longitudinal and lateral directions and in a matrix manner (lattice manner). The shape of the through hole 21A may be any shape. The through hole 21A may be a circular hole with a diameter of approximately several ten μm (for example, approximately 50 μm). Note that the metal plate 22A of FIG. 3A does not include the above interconnection path.

Further, as illustrated in FIG. 3B, plural through holes 21B may be formed in a rectangular metal plate 22B that configures the layer 22 of the laminated body 20 at regular pitches in the longitudinal and lateral directions. The shape of the through hole 21B may be any shape. The through hole 21B may be a circular hole with a diameter of approximately several ten μm (for example, approximately 50 μm).

In the example illustrated in FIG. 3B, the through holes 21B are aligned in the longitudinal and lateral directions such that a rhombus S indicated by two-dot chain lines is formed in a case where the centers of the neighboring through holes 21B are connected. In this example, an interconnection path 23B is formed to become an opening that obliquely connects respective centers PB of the neighboring rhombi S. Further, it may be considered that the interconnection path 23B extends in a parallel direction with a first direction in which the through holes 21B are mutually connected without crossing the interconnection path 23B. Further, it may also be considered that the interconnection path 23B is formed to become an opening that connects the middle points (PB) of straight lines which mutually connect the neighboring through holes 21B at longer separate distances among the neighboring through holes 21B in different directions from the first direction (the neighboring through holes 21B in the longitudinal direction and the lateral direction). Further, for example, in a case where the metal plate 22B and the metal plate 22A are laminated, the through holes 21B and the interconnection paths 23B are aligned such that the through hole 21A overlaps with the through hole 21B and the through holes 21A overlap with both end portions of the interconnection path 23B. Thus, in this case, the interconnection path 23B may interconnect the through holes 21A.

The shape of the interconnection path 23B may be any shape. For example, in a case where the through hole 21B is a circular hole with a diameter of approximately several ten μm (for example, approximately 50 μm), the interconnection path 23B may be a slit with a width of approximately several ten μm (for example, approximately 50 μm).

Further, as illustrated in FIG. 3C, plural through holes 21C may be formed in a rectangular metal plate 22C that configures the layer 22 of the laminated body 20. The shape of the through hole 21C may be any shape. The through hole 21C may be a circular hole with a diameter of approximately several ten μm (for example, approximately 50 μm).

In the example illustrated in FIG. 3C, the through holes 21C are aligned in the longitudinal and lateral directions such that an inclined straight line L indicated by two-dot chain lines is formed in a case where the centers of the neighboring through holes 21C are connected without crossing an interconnection path 23C. In this example, the interconnection path 23C is formed to become an opening that laterally connects two intermediate points PC in a case where the straight line that mutually connects the neighboring through holes 21C in the lateral direction is divided into three equivalent parts. Further, for example, in a case where the metal plate 22A and the metal plate 22C are laminated, the through holes 21C and the interconnection paths 23C are aligned such that the through hole 21A overlaps with the through hole 21C and the through holes 21A overlap with both end portions of the interconnection path 23C. Thus, in this case, the interconnection path 23C may interconnect the through holes 21A.

The shape of the interconnection path 23C may be any shape. For example, in a case where the through hole 21C is a circular hole with a diameter of approximately several ten μm (for example, approximately 50 μm), the interconnection path 23C may be a slit with a width of approximately several ten μm (for example, approximately 50 μm).

As described above, the gas diffusion device 9 of this embodiment may appropriately inhibit a possibility of non-uniform diffusion of the gas that flows in the gas diffuser 24 of the first gas diffusion layer 1.

That is, in a case where the first gas diffusion layer 1 has a configuration in which gas is caused to flow into through holes of the gas diffuser 24 through gas flow paths of proper flow path members and where the first gas diffusion layer 1 does not include the above interconnection path, gas does not flow through the through holes of the gas diffuser 24 that are positioned on vertical lines in portions in which the gas flow paths of the flow path members are not provided, and the gas diffusion of the gas diffuser 24 possibly becomes non-uniform. However, the first gas diffusion layer 1 of this embodiment may cause gas to flow through the through holes 21 of such a gas diffuser 24 via the above interconnection paths 23 and thus may appropriately inhibit non-uniform gas diffusion.

Further, in the gas diffusion device 9 of this embodiment, the metal plates 22A, 22B, and 22C that configure the plural layers 22 of the gas diffuser 24 are joined together by metal joining by welding, soldering, deposition, or the like, for example. Thus, deformation of the gas diffusion device 9 is appropriately inhibited against pressing to the gas diffuser 24.

Except for the above features, the gas diffusion device 9 of this embodiment may be similar to the gas diffusion device 9 of any of the first embodiment, the modification example of the first embodiment, and the example of the first embodiment.

Further, the shapes and dimensions of the through hole 21 and the interconnection path 23 in the above description are examples, and embodiments are not limited to this examples.

Modification Example

Figure 4:
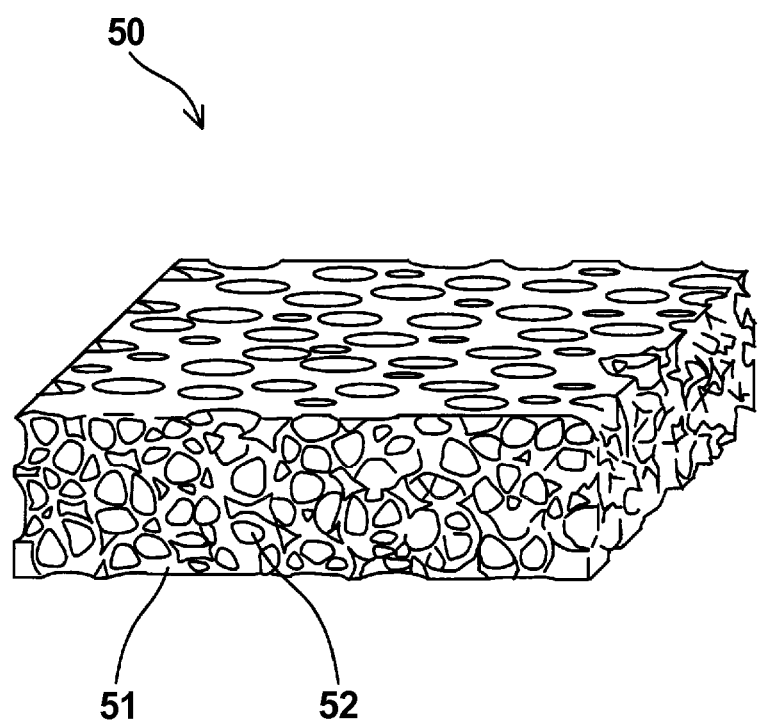
FIG. 4 is a diagram that illustrates one example of the gas diffuser in the gas diffusion device of a modification example of the second embodiment.

FIG. 4 is a diagram that illustrates one example of the gas diffuser in the gas diffusion device of a modification example of the second embodiment.

As for the gas diffusion device 9 of this embodiment, in the gas diffusion device 9 of the first embodiment or the example of the first embodiment, the first gas diffusion layer 1 includes a sintered metal body 50 that diffuses gas. That is, in the gas diffusion device 9 of this modification example, the sintered metal body 50 that is disclosed in Japanese Unexamined Patent Application Publication No. 2009-277583 and so forth configures the gas diffuser 24 of the first gas diffusion layer 1.

Specifically, as illustrated in FIG. 4, the sintered metal body 50 is obtained by sintering metal powder and includes a porous configuration formed with a skeleton portion 51 and plural vacant hole portions 52.

The vacant hole portion 52 is a space with a diameter of approximately several ten μm (for example, approximately 50 μm) and communicates with each other. Accordingly, in a case where gas passes through the sintered metal body 50 in the thickness direction, gas may be diffused. Note that the sintered metal body 50 is processed to have a smooth surface. A smoothing process may be performed such that the thickness of the sintered metal body 50 becomes substantially the same as the thickness of the first gas diffusion layer 1.

As described above, the gas diffusion device 9 of this modification example may appropriately inhibit a possibility of non-uniform diffusion of the gas that flows in the gas diffuser 24 of the first gas diffusion layer 1.

That is, in a case where the first gas diffusion layer 1 has a configuration in which gas is caused to flow into the gas diffuser 24 through gas flow paths of proper flow path members and where the first gas diffusion layer 1 does not include the above sintered metal body 50, gas does not flow through the gas diffuser 24 that is positioned on vertical lines in portions in which the gas flow paths of the flow path members are not provided, and the gas diffusion of the gas diffuser 24 possibly becomes non-uniform. However, the first gas diffusion layer 1 of this modification example may cause gas to flow through such a gas diffuser 24 via the vacant hole portions 52 of the above sintered metal body 50 and thus may appropriately inhibit non-uniform gas diffusion.

Except for the above features, the gas diffusion device 9 of this modification example may be similar to the gas diffusion device 9 of any of the first embodiment, the modification example of the first embodiment, and the example of the first embodiment. Further, the dimension of the vacant hole portion 52 in the above description is an example, and embodiments are not limited to this example.

Third Embodiment

Apparatus Configuration

Figure 5:
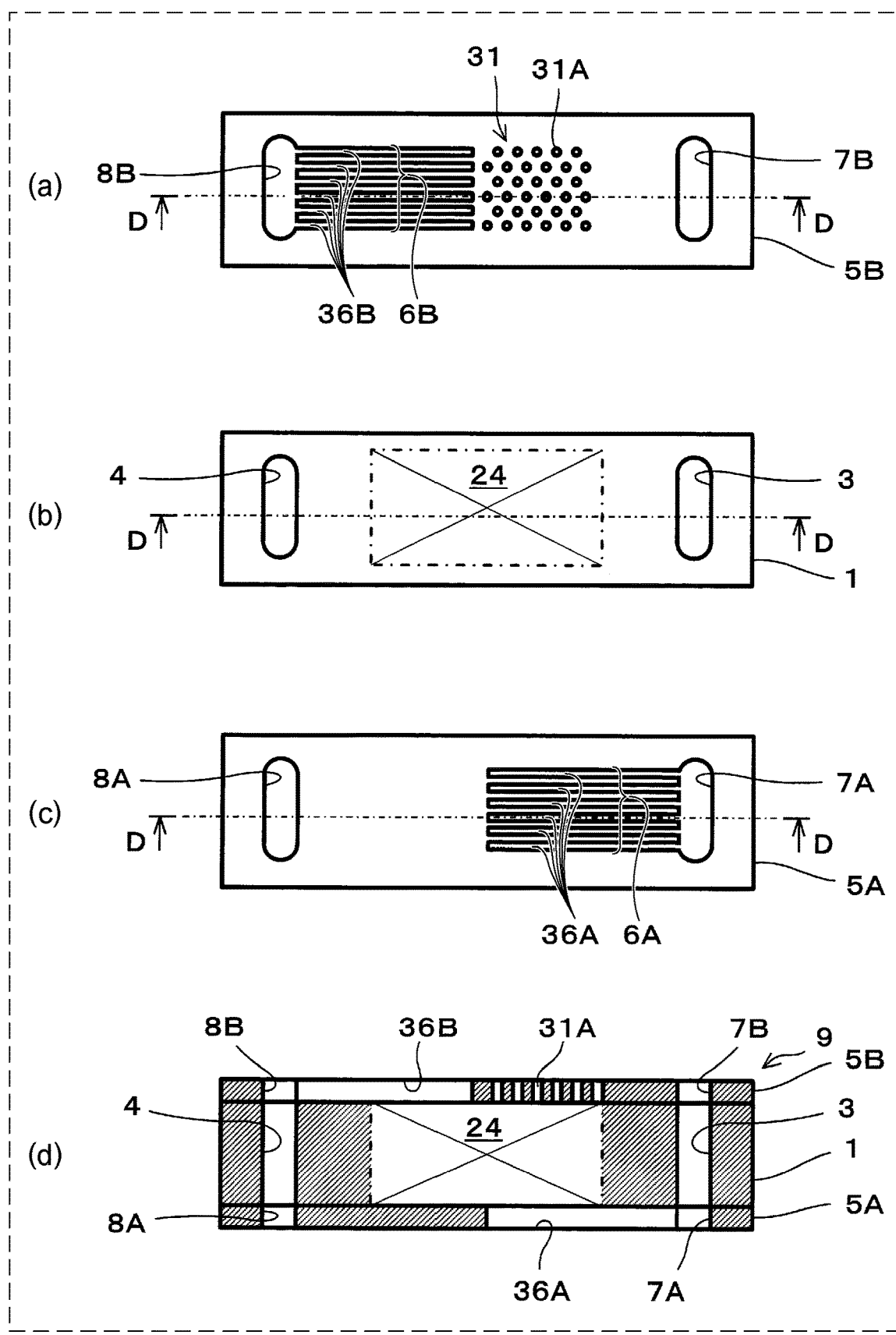
FIG. 5 is a diagram that illustrates one example of the gas diffusion device of a third embodiment.

FIG. 5 is a diagram that illustrates one example of the gas diffusion device of a third embodiment. FIG. 5(*a*) is a diagram of a first metal plate 5B of the gas diffusion device 9 in a planar view. FIG. 5(*b*) is a diagram of the first gas diffusion layer 1 of the gas diffusion device 9 in a planar view. FIG. 5(*c*) is a diagram of a first metal plate 5A of the gas diffusion device 9 in a planar view.

FIG. 5(*d*) is a cross-sectional diagram of the gas diffusion device 9. That is, FIG. 5(*d*) illustrates the cross section of the gas diffusion device 9 that corresponds to D-D part in a case where members that are illustrated in FIG. 5(*a*), FIG. 5(*b*), and FIG. 5(*c*) in a planar view are laminated.

In the example illustrated in FIG. 5, the gas diffusion device 9 includes the first metal plate 5A, the first gas diffusion layer 1, and the first metal plate 5B. The first gas diffusion layer 1 is similar to the gas diffusion device 9 of the first embodiment, and a description will thus not be made.

As for the gas diffusion device 9 of a first aspect of the third embodiment, in the gas diffusion device 9 of any of the first embodiment, the example of the first embodiment, the second embodiment, and the modification example of the second embodiment, the first metal plates 5A and 5B are respectively provided to both main surfaces of the first gas diffusion layer 1, a manifold hole that is provided to the one first metal plate 5A includes a first introduction manifold hole 7A that introduces gas to a gas flow path 6A which is provided to the one first metal plate 5A, and a manifold hole that is provided to the other first metal plate 5B includes a second lead-out manifold hole 8B through which gas from a gas flow path 6B which is provided to the other first metal plate 5B is led out.

As for the gas diffusion device 9 of a second aspect of the third embodiment, in the gas diffusion device 9 of the first aspect of the third embodiment, the manifold hole that is provided to the one first metal plate 5A includes a first lead-out manifold hole 8A that communicates with the second lead-out manifold hole 8B, and the gas flow path 6A that is provided to the one first metal plate 5A does not communicate with the first lead-out manifold hole 8A.

As for the gas diffusion device 9 of a third aspect of the third embodiment, in the gas diffusion device 9 of the first aspect or the second aspect of the third embodiment, the manifold hole that is provided to the other first metal plate 5B includes a second introduction manifold hole 7B that communicates with the first introduction manifold hole 7A, and the gas flow path 6B that is provided to the other first metal plate 5B does not communicate with the second introduction manifold hole 7B.

Further, as for the gas diffusion device 9 of a fourth aspect of the third embodiment, in the gas diffusion device 9 of any of the first to third aspects of the third embodiment, the other first metal plate 5B is provided with a gas diffuser 31 that diffuses gas which flows from the first gas diffusion layer 1 into a region in which the gas flow path 6B is not provided.

Specifically, as illustrated in FIG. 5, the first introduction manifold hole 7A of the first metal plate 5A is arranged to be opposed to the second introduction manifold hole 7B of the first metal plate 5B via the manifold hole 3 of the first gas diffusion layer 1.

The first lead-out manifold hole 8A of the first metal plate 5A is arranged to be opposed to the second lead-out manifold hole 8B of the first metal plate 5B via the manifold hole 4 of the first gas diffusion layer 1.

That is, a tubular gas introduction manifold of the gas diffusion device 9 is formed with the first introduction manifold hole 7A, the manifold hole 3, and the second introduction manifold hole 7B. A tubular gas lead-out manifold of the gas diffusion device 9 is formed with the first lead-out manifold hole 8A, the manifold hole 4, and the second lead-out manifold hole 8B.

Further, the gas flow path 6A of the first metal plate 5A communicates with the first introduction manifold hole 7A and is configured with plural slit holes 36A that extend mutually in parallel from the portion in which the gas flow path 6A communicates with the first introduction manifold hole 7A to a portion around a central portion of the first metal plate 5A. That is, the slit holes 36A do not communicate with the first lead-out manifold hole 8A.

Further, the gas flow path 6B of the first metal plate 5B communicates with the second lead-out manifold hole 8B and is configured with plural slit holes 36B that extend mutually in parallel from the portion in which the gas flow path 6B communicates with the second lead-out manifold hole 8B to a portion around a central portion of the first metal plate 5B. That is, the slit holes 36B do not communicate with the second introduction manifold hole 7B.

Further, the gas diffuser 31 of the first metal plate 5B is configured with plural through holes 31A that are arranged at prescribed regular pitches in a spot, in which the gas flow path 6B is not provided, of the portion of the first metal plate 5B which faces the gas diffuser 24 of the first gas diffusion layer 1.

Although not illustrated in FIG. 5, in the gas diffusion device 9 of this embodiment, a proper metal member (for example, the above second metal plate 10 or the like) for blocking the slit holes 36A may be arranged on a main surface of the first metal plate 5A that does not face the first gas diffusion layer 1.

Action

In the following, one example of an action of the gas diffusion device 9 of the third embodiment will be described with reference to FIG. 5. Note that a portion of or the whole following action may be performed by a control program of a controller, which is not illustrated. The controller may be in any configuration as long as the controller has a control function. The controller includes an arithmetic circuit and a storage circuit that stores the control program, for example. Examples of the arithmetic circuit may include an MPU, a CPU, and so forth, for example. Examples of the storage circuit may include a memory, for example. The controller may be configured with a single controller that performs centralized control or may be configured with plural controllers that mutually and cooperatively perform distributed control.

First, gas is supplied from the outside to the first introduction manifold hole 7A. Then, because the first introduction manifold hole 7A communicates with one ends of the gas flow path 6A of the first metal plate 5A, gas is delivered from the first introduction manifold hole 7A to the gas flow path 6A.

Here, the whole amount of the gas that flows through the gas flow path 6A is delivered to the gas diffuser 24 of the first gas diffusion layer 1. The gas diffuser 24 includes the gas diffusion function, which is described above. Thus, the gas that flows from the gas flow path 6A toward the main surface (hereinafter referred to as an opposite surface) of the gas diffuser 24 which does not face the first metal plate 5A passes through the opposite surface of the gas diffuser 24 and is delivered to the first metal plate 5B while being uniformly diffused by the gas diffuser 24.

In the first metal plate 5B, the gas diffused by the gas diffuser 24 is supplied to proper members that are arranged on the first metal plate 5B and are not illustrated (for example, a catalyst layer and so forth) through the through holes 31A and the gas flow path 6B.

Excess gas that does not pass through the first metal plate 5B is delivered to the second lead-out manifold hole 8B that communicates with one ends of the gas flow path 6B of the first metal plate 5B and is discharged to the outside.

As described above, the gas diffusion device 9 of this embodiment does not cause the gas flow path 6A of the first metal plate 5A to communicate with the first lead-out manifold hole 8A and may thereby deliver the whole amount of the gas that flows through the gas flow path 6A of the first metal plate 5A from the gas diffuser 24 of the first gas diffusion layer 1 to the first metal plate 5B.

Further, an appropriate amount of the gas diffused by the gas diffuser 24 may be supplied to proper members (for example, a catalyst layer and so forth) through the through holes 31A and the gas flow path 6B, and the excess gas of the gas diffuser 24 may be discharged to the outside through the second lead-out manifold hole 8B. Thus, because the excess gas of the gas diffuser 24 is inhibited from returning to the first metal plate 5A, the flow of gas of the gas diffuser 24 becomes smooth.

Further, in the gas diffusion device 9 of this embodiment, the flow path length of the gas flow path 6A of the first metal plate 5A is set to the distance from the first introduction manifold hole 7A to the vicinity of the central portion of the first metal plate 5A, and the flow path length of the gas flow path 6B of the first metal plate 5B is set to the distance from the vicinity of the central portion of the first metal plate 5B to the second lead-out manifold hole 8B. However, those flow path lengths are examples, and embodiments are not limited to those examples. That is, the flow path lengths of the gas flow path 6A and the gas flow path 6B may be set to distances in which gas may be supplied to the gas diffuser 24 of the first gas diffusion layer 1 as uniformly as possible. In this case, the flow path lengths have to be set to desired values in consideration of porosity and pressure drop of the gas diffuser 24, the thickness of the first gas diffusion layer 1, physical properties of gas, and so forth.

Further, in the gas diffusion device 9 of this embodiment, the first metal plate 5A, the first gas diffusion layer 1, and the first metal plate 5B may be integrally bonded by metal joining by welding, soldering, deposition, or the like. For example, surface joining by diffusion joining or the like may be performed for the main surface of the first metal plate 5A, the main surface of the first gas diffusion layer 1, and the main surface of the first metal plate 5B. Accordingly, compared to a case where the first metal plate 5A, the first gas diffusion layer 1, and the first metal plate 5B are laminated by fixing by a mechanical fastening member, gaps do not remain in the respective joining portions, and the contact resistance (electric resistance) of the gas diffusion device 9 may thus be reduced. Then, for example, in a case where the gas diffusion device 9 is used for an electrochemical hydrogen pump or the like and a desired voltage is applied to the gas diffusion device 9, an increase in power consumption that is requested for the electrochemical hydrogen pump may be inhibited.

Except for the above features, the gas diffusion device 9 of this embodiment may be similar to the gas diffusion device 9 of any of the first embodiment, the modification example of the first embodiment, the example of the first embodiment, the second embodiment, and the modification example of the second embodiment.

Fourth Embodiment

Figure 6:
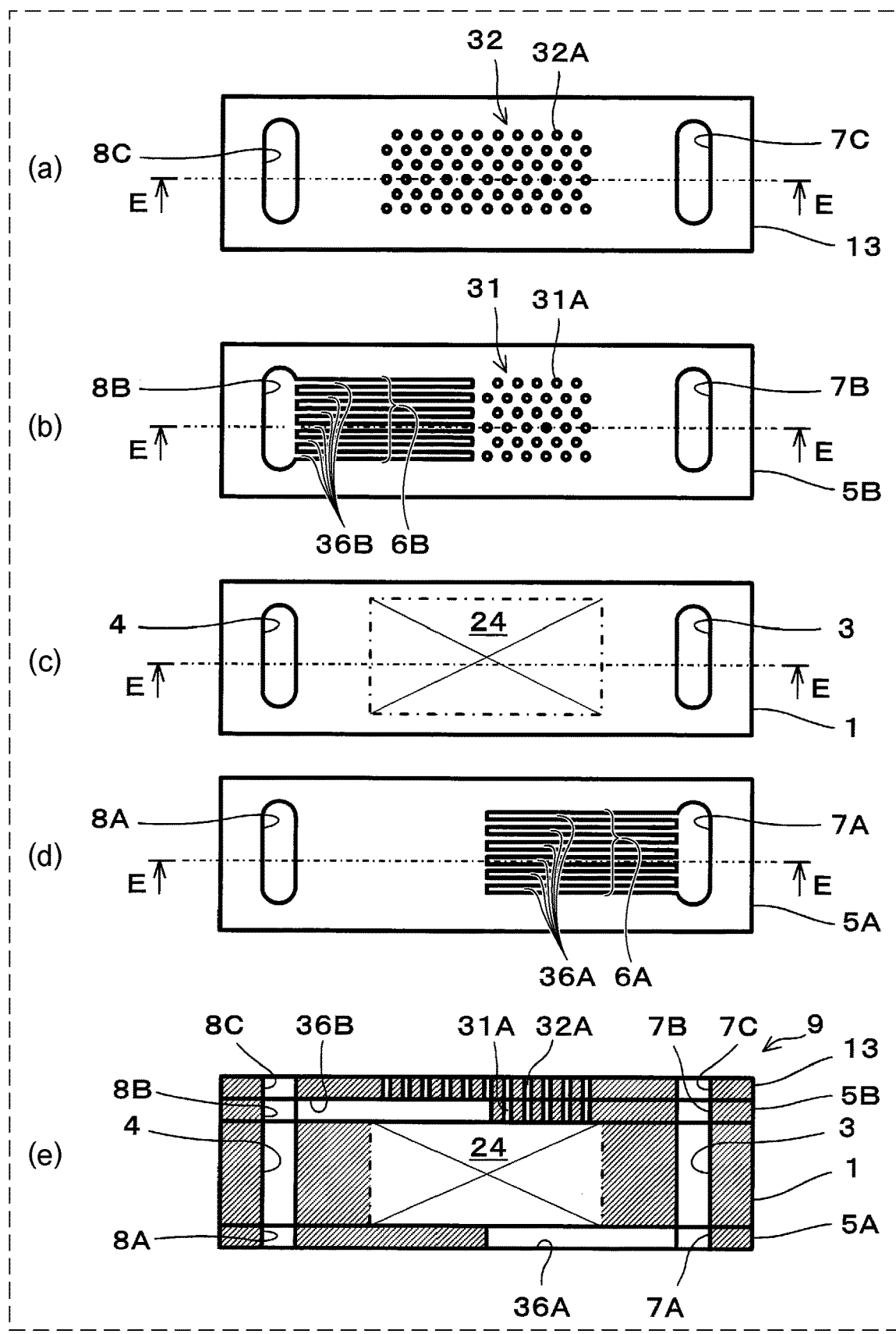
FIG. 6 is a diagram that illustrates one example of the gas diffusion device of a fourth embodiment.

FIG. 6 is a diagram that illustrates one example of the gas diffusion device of a fourth embodiment. FIG. 6(*a*) is a diagram of a second gas diffusion layer 13 of the gas diffusion device 9 in a planar view. FIG. 6(*b*) is a diagram of the first metal plate 5B of the gas diffusion device 9 in a planar view. FIG. 6(*c*) is a diagram of the first gas diffusion layer 1 of the gas diffusion device 9 in a planar view. FIG. 6(*d*) is a diagram of the first metal plate 5A of the gas diffusion device 9 in a planar view.

FIG. 6(*e*) is a cross-sectional diagram of the gas diffusion device 9. That is, FIG. 6(*e*) illustrates the cross section of the gas diffusion device 9 that corresponds to E-E part in a case where members that are illustrated in FIG. 6(*a*), FIG. 6(*b*), FIG. 6(*c*), and FIG. 6(*d*) in a planar view are laminated.

In the example illustrated in FIG. 6, the gas diffusion device 9 includes the second gas diffusion layer 13, the first metal plate 5A, the first gas diffusion layer 1, and the first metal plate 5B. The first metal plate 5A, the first gas diffusion layer 1, and the first metal plate 5B are similar to the gas diffusion device 9 of the third embodiment, and a description will thus not be made.

In the gas diffusion device 9 of any of the first to fourth aspects of the third embodiment, the gas diffusion device 9 of a first aspect of the fourth embodiment includes the second gas diffusion layer 13 that diffuses gas on the main surface that does not face the first gas diffusion layer 1 of the main surfaces of the other first metal plate 5B.

Further, as for the gas diffusion device 9 of a second aspect of the fourth embodiment, in the gas diffusion device 9 of the first aspect of the fourth embodiment, the second gas diffusion layer 13 is provided with a third introduction manifold hole 7C that communicates with the second introduction manifold hole 7B and a third lead-out manifold hole 8C that communicates with the second lead-out manifold hole 8B.

Specifically, as illustrated in FIG. 6, the second introduction manifold hole 7B of the first metal plate 5B is arranged to be opposed to the third introduction manifold hole 7C of the second gas diffusion layer 13.

The second lead-out manifold hole 8B of the first metal plate 5B is arranged to be opposed to the third lead-out manifold hole 8C of the second gas diffusion layer 13.

That is, a tubular gas introduction manifold of the gas diffusion device 9 is formed with the first introduction manifold hole 7A, the manifold hole 3, the second introduction manifold hole 7B, and the third introduction manifold hole 7C. A tubular gas lead-out manifold of the gas diffusion device 9 is formed with the first lead-out manifold hole 8A, the manifold hole 4, the second lead-out manifold hole 8B, and the third lead-out manifold hole 8C.

The second gas diffusion layer 13 may be in any configuration as long as the second gas diffusion layer 13 may diffuse the gas that passes through the second gas diffusion layer 13. In the gas diffusion device 9 of this embodiment, a gas diffuser 32 of the second gas diffusion layer 13 is configured with plural through holes 32A that are arranged at regular pitches in the portion that faces the gas diffuser 24 of the first gas diffusion layer 1 via the first metal plate 5B, for example.

Note that the second gas diffusion layer 13 may be in any configuration as long as the second gas diffusion layer 13 is a metal member that diffuses gas. The second gas diffusion layer 13 may be configured with metal such as stainless steel, titanium, a titanium alloy, or an aluminum alloy, for example. The thickness of the second gas diffusion layer 13 may be approximately several ten μm (for example, approximately 50 μm). Those materials and values are examples, and embodiments are not limited to those examples.

Further, although not illustrated in FIG. 6, in the gas diffusion device 9 of this embodiment, a proper metal member (for example, the above second metal plate 10 or the like) for blocking the slit holes 36A may be arranged on the main surface of the first metal plate 5A that does not face the first gas diffusion layer 1.

As described above, the gas diffusion device 9 of this embodiment does not cause the gas flow path 6A of the first metal plate 5A to communicate with the first lead-out manifold hole 8A and may thereby deliver the whole amount of the gas that flows through the gas flow path 6A of the first metal plate 5A from the gas diffuser 24 of the first gas diffusion layer 1 to the first metal plate 5B and further to the second gas diffusion layer 13.

Then, in the second gas diffusion layer 13, an appropriate amount of the gas diffused by the gas diffuser 24 of the first gas diffusion layer 1 is further diffused by the second gas diffusion layer 13. Particularly, because the gas diffuser 32 of the second gas diffusion layer 13 is provided with the plural through holes 32A at regular pitches, gas may thoroughly and uniformly be supplied to all ranges of proper members that are arranged on the second gas diffusion layer 13 and are not illustrated (for example, a catalyst layer and so forth).

Further, in the gas diffusion device 9 of this embodiment, the first metal plate 5A, the first gas diffusion layer 1, the first metal plate 5B, and the second gas diffusion layer 13 may be integrally bonded by metal joining by welding, soldering, deposition, or the like. For example, surface joining by diffusion joining or the like may be performed for the main surface of the first metal plate 5A, the main surface of the first gas diffusion layer 1, the main surface of the first metal plate 5B, and a main surface of the second gas diffusion layer 13. Accordingly, compared to a case where the first metal plate 5A, the first gas diffusion layer 1, the first metal plate 5B, and the second gas diffusion layer 13 are laminated by fixing by a mechanical fastening member, gaps do not remain in the respective joining portions, and the contact resistance (electric resistance) of the gas diffusion device 9 may thus be reduced. Then, for example, in a case where the gas diffusion device 9 is used for an electrochemical hydrogen pump or the like and a desired voltage is applied to the gas diffusion device 9, an increase in power consumption that is requested for the electrochemical hydrogen pump may be inhibited.

Except for the above features, the gas diffusion device 9 of this embodiment may be similar to the gas diffusion device 9 of any of the first to fourth aspects of the third embodiment.

Fifth Embodiment

Figure 7:
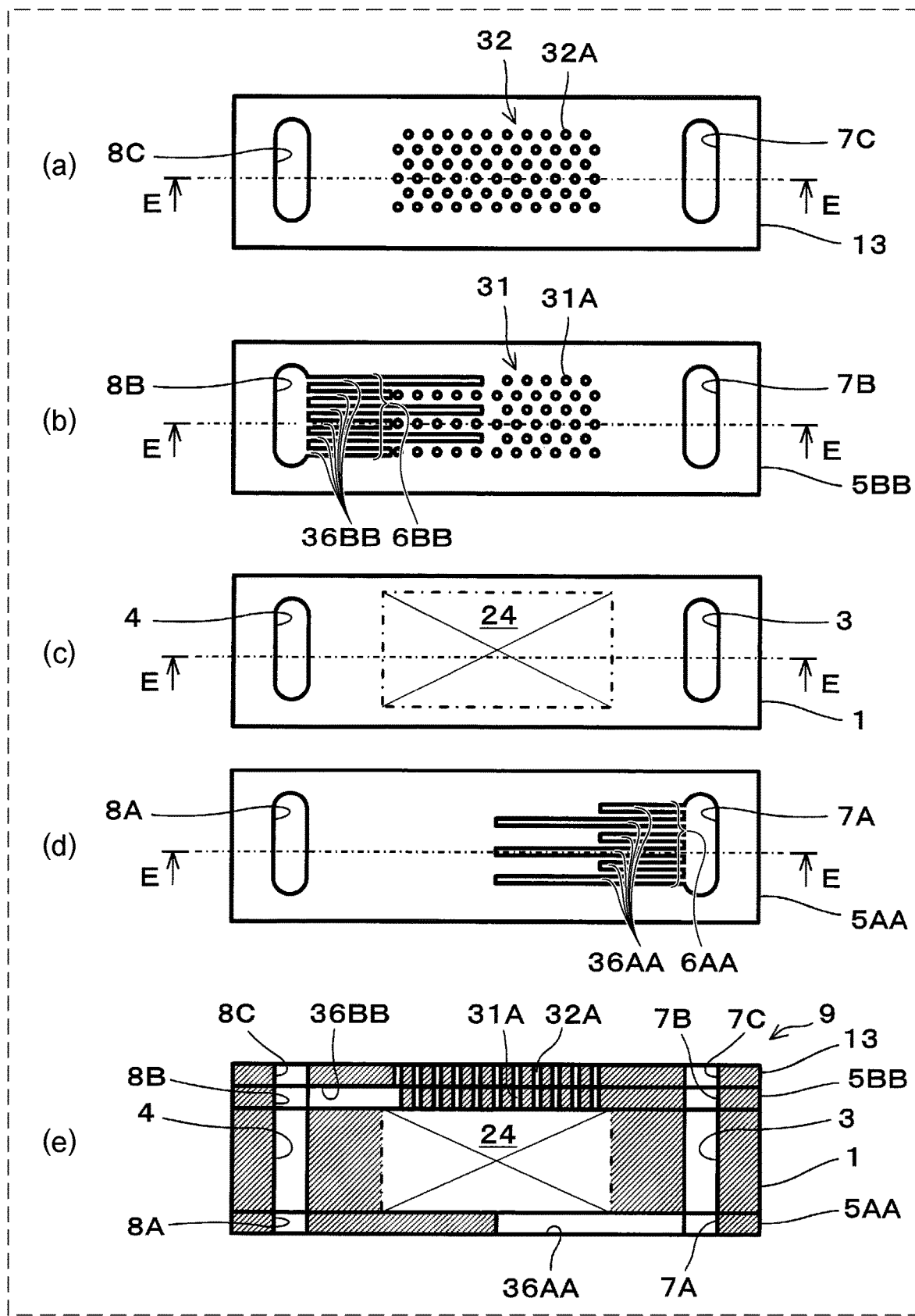
FIG. 7 is a diagram that illustrates one example of the gas diffusion device of a fifth embodiment.

FIG. 7 is a diagram that illustrates one example of the gas diffusion device of a fifth embodiment. FIG. 7(a) is a diagram of the second gas diffusion layer 13 of the gas diffusion device 9 in a planar view. FIG. 7(b) is a diagram of a first metal plate 5BB of the gas diffusion device 9 in a planar view. FIG. 7(c) is a diagram of the first gas diffusion layer 1 of the gas diffusion device 9 in a planar view. FIG. 7(d) is a diagram of a first metal plate 5AA of the gas diffusion device 9 in a planar view.

FIG. 7(e) is a cross-sectional diagram of the gas diffusion device 9. That is, FIG. 7(e) illustrates the cross section of the gas diffusion device 9 that corresponds to E-E part in a case where members that are illustrated in FIG. 7(a), FIG. 7(b), FIG. 7(c), and FIG. 7(d) in a planar view are laminated.

In the example illustrated in FIG. 7, the gas diffusion device 9 includes the second gas diffusion layer 13, the first metal plate 5AA, the first gas diffusion layer 1, and the first metal plate 5BB. The first gas diffusion layer 1 and the second gas diffusion layer 13 are similar to the gas diffusion device 9 of the fourth embodiment, and a description will thus not be made.

As for the gas diffusion device 9 of a first aspect of the fifth embodiment, in the gas diffusion device 9 of any of the first to fourth aspects of the third embodiment and the first and second aspects of the fourth embodiment, a gas flow path that is provided to the one first metal plate 5AA includes plural parallel gas flow paths 6AA that communicate with the first introduction manifold hole 7A, and the plural gas flow paths 6AA are different in the length of the flow path.

As for the gas diffusion device 9 of a second aspect of the fifth embodiment, in the gas diffusion device 9 of any of the first to fourth aspects of the third embodiment, the first and second aspects of the fourth embodiment, and the first aspect of the fifth embodiment, a gas flow path that is provided to the other first metal plate 5BB includes plural parallel gas flow paths 6BB that communicate with the second lead-out manifold hole 8B, and the plural gas flow paths 6BB are different in the length of the flow path.

Specifically, as illustrated in FIG. 6, the gas flow paths 6AA of the first metal plate 5AA communicate with the first introduction manifold hole 7A, are configured with plural slit holes 36AA that extend mutually in parallel, and are configured such that the lengths of those slit holes 36AA are non-uniform. The gas flow paths 6BB of the first metal plate 5BB communicate with the second lead-out manifold hole 8B, are configured with plural slit holes 36BB that extend mutually in parallel, and are configured such that the lengths of those slit holes 36BB are non-uniform.

As described above, in the gas diffusion device 9 of this embodiment, the lengths of the gas flow paths 6AA of the first metal plate 5AA are configured to be non-uniform, and gas is thereby supplied from the gas flow paths 6AA to the gas diffuser 24, thoroughly throughout adjacent portions to and distant portions from the first introduction manifold hole 7A in the gas diffuser 24 of the first gas diffusion layer 1. Further, the lengths of the gas flow paths 6BB of the first metal plate 5BB are configured to be non-uniform, and excess gas is thereby discharged from the gas diffuser 24 to the gas flow paths 6BB, thoroughly throughout adjacent portions to and distant portions from the second lead-out manifold hole 8B in the gas diffuser 24 of the first gas diffusion layer 1.

Note that the flow path lengths of the gas flow paths 6AA and the gas flow paths 6BB may be set to distances in which gas may be supplied to the gas diffuser 24 of the first gas diffusion layer 1 as uniformly as possible. In this case, the flow path lengths have to be set to desired values in consideration of porosity and pressure drop of the gas diffuser 24, the thickness of the first gas diffusion layer 1, physical properties of gas, and so forth.

Further, except for the above features, the gas diffusion device 9 of this embodiment may be similar to the gas diffusion device 9 of any of the first to fourth aspects of the third embodiment and the first and second aspects of the fourth embodiment.

Sixth Embodiment

Apparatus Configuration

Figure 8:
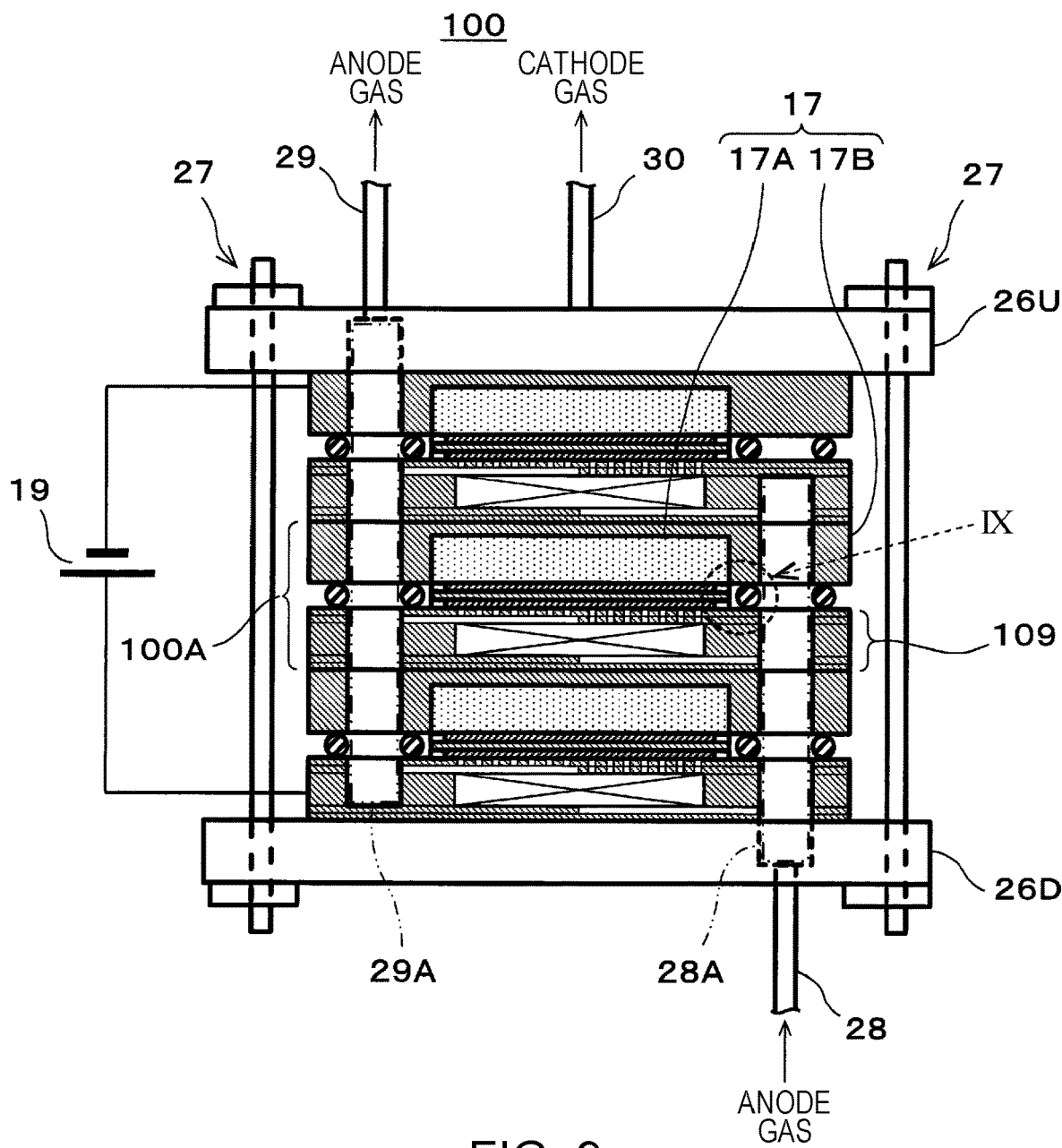
FIG. 8 is a diagram that illustrates one example of an electrochemical hydrogen pump of a sixth embodiment.
Figure 9:
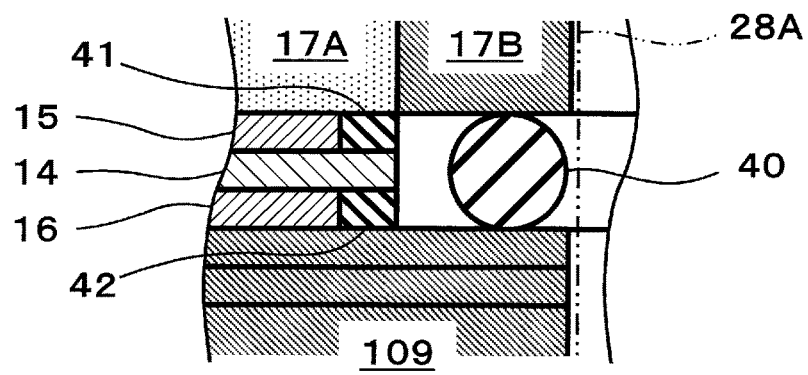
FIG. 9 is a diagram that illustrates one example of the electrochemical hydrogen pump of the sixth embodiment.

FIG. 8 and FIG. 9 are diagrams that illustrate one example of an electrochemical hydrogen pump of a sixth embodiment. FIG. 9 is an enlarged diagram of IX part in FIG. 8.

A electrochemical hydrogen pump 100 of this embodiment includes an electrolyte membrane 14 that includes a pair of main surfaces, a cathode catalyst layer 15 that is provided to one main surface of the electrolyte membrane 14, an anode catalyst layer 16 that is provided to the other main surface of the electrolyte membrane 14, a cathode gas diffusion device 17 that is provided to the cathode catalyst layer 15, an anode gas diffusion device 109 that is provided to the anode catalyst layer 16, and a voltage applicator 19 that applies a voltage between the cathode catalyst layer 15 and the anode catalyst layer 16.

A unit cell 100A of the electrochemical hydrogen pump 100 includes the electrolyte membrane 14, the cathode catalyst layer 15, the anode catalyst layer 16, the cathode gas diffusion device 17, and the anode gas diffusion device 109. Thus, the electrochemical hydrogen pump 100 of FIG. 8 configures a stack in which three tiers of the unit cells 100A are laminated. However, the number of tiers of the unit cells 100A is not limited to this. That is, the number of tiers of the unit cells 100A may be set to a proper number based on operation conditions such as the hydrogen amount of the electrochemical hydrogen pump 100.

In order to appropriately hold the unit cells 100A in a laminated state, an end surface of the cathode gas diffusion device 17 of the uppermost layer of the unit cells 100A and an end surface of the anode gas diffusion device 109 of the lowermost layer are interposed between an end plate 26U and an end plate 26D via insulating plates or the like, which are not illustrated, and a desired fastening pressure has to be thereby exerted on the unit cells 100A. Thus, plural fastening members 27 that include a disc spring for exerting the fastening pressure on the unit cells 100A (for example, bolts that pass through the end plate 26U and the end plate 26D and nuts or the like) are provided in appropriate positions of the end plate 26U and the end plate 26D.

The end plate 26U is provided with a cathode gas lead-out pipe 30 through which cathode gas from the cathode gas diffusion device 17 flows. That is, the cathode gas lead-out pipe 30 communicates with a cathode gas lead-out manifold that is provided to the unit cell 100A and is not illustrated.

The end plate 26U is also provided with an anode gas lead-out pipe 29 through which excess anode gas from the anode gas diffusion device 109 flows. That is, the anode gas lead-out pipe 29 communicates with an anode gas lead-out manifold 29A that is provided to the unit cell 100A in a laminated state. Note that in a planar view, a sealing member 40 such as an O-ring is provided so as to surround the anode gas lead-out manifold 29A between the cathode gas diffusion device 17 and the anode gas diffusion device 109, and the anode gas lead-out manifold 29A is appropriately sealed by the sealing member 40.

The end plate 26D is provided with an anode gas introduction pipe 28 through which the anode gas supplied to the anode gas diffusion device 109 flows. That is, the anode gas introduction pipe 28 communicates with an anode gas introduction manifold 28A that is provided to the unit cell 100A in the laminated state. Note that in a planar view, the sealing member 40 such as an O-ring is provided so as to surround the anode gas introduction manifold 28A between the cathode gas diffusion device 17 and the anode gas diffusion device 109, and the anode gas introduction manifold 28A is appropriately sealed by the sealing member 40.

The electrolyte membrane 14 is a proton-conductive polymer membrane through which protons ($H^+$) are permeable. The electrolyte membrane 14 may be any membrane as long as that is the proton-conductive polymer membrane. For example, as the electrolyte membrane 14, a fluorine-based polymer electrolyte membrane and so forth may be raised. Specifically, for example, Nafion® (DuPont), Aciplex™ (Asahi Kasei Corporation), and so forth may be used.

As described above, the cathode catalyst layer 15 is provided on one main surface (for example, the front surface) of the electrolyte membrane 14. Note that in a planar view, a sealing member 41 such as an O-ring is provided so as to surround the cathode catalyst layer 15, and the cathode catalyst layer 15 is appropriately sealed by the sealing member 41. The cathode catalyst layer 15 includes platinum as catalyst metal, for example, but embodiments are not limited to this.

As described above, the anode catalyst layer 16 is provided on the other main surface (for example, the back surface) of the electrolyte membrane 14. Note that in a planar view, a sealing member 42 such as an O-ring is provided so as to surround the anode catalyst layer 16, and the anode catalyst layer 16 is appropriately sealed by the sealing member 42. The anode catalyst layer 16 includes RuIrFeOx as catalyst metal, for example, but embodiments are not limited to this.

Because various methods may be raised as catalyst adjustment methods for the cathode catalyst layer 15 and the anode catalyst layer 16, the adjustment methods are not particularly limited. For example, as carriers of the catalysts, electrically-conductive porous substance powder, carbon-based powder, and so forth may be raised. As the carbon-based powder, for example, powder of graphite, carbon black, activated carbon that is electrically conductive, or the like may be raised. A method for supporting platinum or another catalyst metal on the carrier such as carbon is not particularly limited. For example, a method such as power mixing or liquid-phase mixing may be used. As the latter liquid-phase mixing, for example, a method in which the carrier such as carbon is dispersed in a catalyst component colloid liquid and adsorption is caused or the like may be raised. Further, using an active oxygen removing agent as the carrier as necessary, platinum or another catalyst metal may be supported by a method similar to the above method. The supported state of the catalyst metal such as platinum on the carrier is not particularly limited. For example, the catalyst metal may be atomized and supported on the carrier in a highly dispersed state.

The cathode gas diffusion device 17 includes a cathode gas diffusion layer 17A and a cathode separator 17B. The cathode gas diffusion layer 17A is provided to contact with the cathode catalyst layer 15. The cathode separator 17B includes a housing portion that houses the cathode gas diffusion layer 17A. As the cathode gas diffusion layer 17A, for example, a paper-like layer that is configured with highly elastic graphite carbon fiber, a porous body in which platinum plating is applied to a surface of a sintered body of titanium powder, or the like may be used. Note that in a case where the former graphite carbon fiber is used and a heat treatment is performed for the carbon fiber at, for example, 2000° or higher, graphite crystals grow and change to graphite fiber.

The cathode separator 17B is provided with the cathode gas lead-out manifold that communicates with the housing portion of the cathode separator 17B and delivers the cathode gas to the cathode gas lead-out pipe 30. However, this cathode gas lead-out manifold is in a common configuration, and illustration or a detailed description will thus not be made.

The anode gas diffusion device 109 includes the gas diffusion device 9 of any of the first embodiment, the example of the first embodiment, the second embodiment, the modification example of the second embodiment, the first to fourth aspects of the third embodiment, the first and second aspects of the fourth embodiment, and the first and second aspects of the fifth embodiment. The anode gas diffusion device 109 is provided to contact with the anode catalyst layer 16. The anode gas diffusion device 109 has the rigidity to the extent that the anode gas diffusion device 109 may stand pressing of the electrolyte membrane 14 by a high pressure. The lamination configuration of the anode gas diffusion device 109 is similar to the gas diffusion device 9 described above, and a detailed description will thus not be made.

As described above, the voltage applicator 19 applies a voltage between the cathode catalyst layer 15 and the anode catalyst layer 16. Specifically, a negative terminal of the voltage applicator 19 is connected with the electrically conductive cathode gas diffusion device 17, and a positive terminal of the voltage applicator 19 is connected with the electrically conductive anode gas diffusion device 109. The voltage applicator 19 may be in any configuration as long as the voltage applicator 19 may apply a voltage between the cathode catalyst layer 15 and the anode catalyst layer 16.

Action

In the following, an action of the electrochemical hydrogen pump 100 of this embodiment will be described with reference to FIG. 9 and FIG. 10. Note that a portion of or the whole following action may be performed by a control program of a controller, which is not illustrated. The controller may be in any configuration as long as the controller has a control function. The controller includes an arithmetic circuit and a storage circuit that stores the control program, for example. Examples of the arithmetic circuit may include an MPU, a CPU, and so forth, for example. Examples of the storage circuit may include a memory, for example. The controller may be configured with a single controller that performs centralized control or may be configured with plural controllers that mutually and cooperatively perform distributed control.

First, the voltage applicator 19 applies the voltage between the cathode gas diffusion device 17 and the anode gas diffusion device 109. The controller controls an action of the voltage applicator 19. For example, the controller may control ON and OFF of the action of the voltage applicator 19. Further, the controller may control the magnitude of the voltage applied by the voltage applicator 19.

Next, through the anode gas introduction pipe 28, the anode gas is supplied to the anode gas diffusion device 109. Then, hydrogen in the anode gas liberates an electron on the anode catalyst layer 16 and becomes a proton ($H^+$) (equation (1)). The liberated electron moves to the cathode catalyst layer 15 via the voltage applicator 19. As the anode gas, for example, reformed gas containing hydrogen, hydrogen-containing gas that is generated by water electrolysis, or the like may be raised.

Meanwhile, a proton permeates the inside of the electrolyte membrane 14 while accompanying a water molecule and moves to the cathode catalyst layer 15. In the cathode catalyst layer 15, the reduction reaction of the proton that permeates the electrolyte membrane 14 and an electron takes place, and the cathode gas (hydrogen gas) is thereby generated (equation (2)).

Accordingly, purification of hydrogen gas is highly efficiently performed from the hydrogen gas (anode gas) that contains impurities such as $CO_2$ gas. Note that the anode gas may contain CO gas as an impurity. In this case, because CO gas lowers catalyst activities of the anode catalyst layer 16 and so forth, it is desirable that CO gas is removed by a CO remover (for example, a transformer, a CO selective oxidizer, or the like), which is not illustrated.

Then, the pressure drop of the cathode gas lead-out pipe 30 is increased, a voltage E of the voltage applicator 19 is raised, the gas pressure of the cathode gas diffusion device 17 thereby rises, and the cathode gas pressure becomes a high pressure. Specifically, the relationship among a gas pressure P1 of an anode, a gas pressure P2 of a cathode, and the voltage E of the voltage applicator 19 is formulated by the following equation (3).

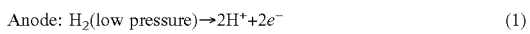

Anode: $H_2$(low pressure)→$2H^+ + 2e^-$     (1)

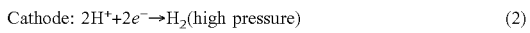

Cathode: $2H^+ + 2e^-$ → $H_2$(high pressure)     (2)

$$E = (RT/2F)\ln(P2/P1) + ir \quad (3)$$

In equation (3), R represents the gas constant (8.3145 J/K·mol), T represents a temperature (K), F represents the Faraday constant (96485 C/mol), P2 represents the gas pressure of the cathode, P1 represents the gas pressure of the anode, i represents current density ($A/cm^2$), and r represents a cell resistance ($\Omega \cdot cm^2$).

It may easily be understood from equation (3) that the voltage E of the voltage applicator 19 is raised and the gas pressure P2 of the cathode may thereby be caused to rise. Note that the pressure drop of the cathode gas lead-out pipe 30 may be increased or decreased in accordance with the opening degree of a switch valve that is provided to the cathode gas lead-out pipe 30, for example.

Then, in a case where the gas pressure of the cathode gas diffusion device 17 becomes a prescribed value or higher, the pressure drop of the cathode gas lead-out pipe 30 is decreased (for example, the opening degree of the switch valve is made higher), and the cathode gas of the cathode gas diffusion device 17 is thereby filled in a high-pressure hydrogen tank, which is not illustrated, through the cathode gas lead-out pipe 30. Meanwhile, in a case where the gas pressure of the cathode gas diffusion device 17 becomes lower than a prescribed pressure, the pressure drop of the cathode gas lead-out pipe 30 is increased (for example, the opening degree of the switch valve is made lower), the cathode gas diffusion device 17 is thereby disconnected from the high-pressure hydrogen tank. Accordingly, the reverse flow of the cathode gas of the high-pressure hydrogen tank to the cathode gas diffusion device 17 is inhibited.

In such a manner, the cathode gas (hydrogen gas) of high purity is pressurized to a desired target pressure and is filled in the high-pressure hydrogen tank by the electrochemical hydrogen pump 100.

As described above, while appropriately securing the gas distribution performance to the first gas diffusion layer 1 of the anode gas diffusion device 109, the electrochemical hydrogen pump 100 of this embodiment may appropriately inhibit deformation of the electrolyte membrane 14 and the anode catalyst layer 16 by the anode gas diffusion device 109 even in a case where the gas pressure of the cathode gas diffusion device 17 becomes a high pressure.

Specifically, in the electrochemical hydrogen pump 100 of this embodiment, for example, as illustrated in FIG. 1A, the first metal plate 5 that includes the gas flow path 6 which communicates with the manifold hole 7 and the manifold hole 8 is laminated to the first gas diffusion layer 1 of the anode gas diffusion device 109, and the distribution performance of gas to the gas diffuser 24 of the first gas diffusion layer 1 is thereby secured.

Further, in the electrochemical hydrogen pump 100 of this embodiment, the metal plates that configure the anode gas diffusion device 109 are laminated, and appropriate rigidity of the anode gas diffusion device 109 may thereby be obtained. Deformation of the anode gas diffusion device 109 may be inhibited even in a case where a high pressure is exerted on the first gas diffusion layer 1 of the anode gas diffusion device 109.

Further, in the electrochemical hydrogen pump 100 of this embodiment, the metal plates that configure the anode gas diffusion device 109 may be integrally bonded by metal joining by welding, soldering, deposition, or the like, for example. For example, surface joining by diffusion joining or the like may be performed for the metal plates that configure the anode gas diffusion device 109. Accordingly, compared to a case where those metal plates are laminated by fixing by a mechanical fastening member, gaps do not remain in the respective joining portions, and the contact resistance (electric resistance) of the anode gas diffusion device 109 may thus be reduced. Then, an increase in power consumption requested for the electrochemical hydrogen pump 100 in a case where a desired voltage is applied to the anode gas diffusion device 109 may be inhibited.

Note that the first embodiment, the example of the first embodiment, the modification example of the first embodiment, the second embodiment, the modification example of the second embodiment, the third embodiment, the fourth embodiment, the fifth embodiment, and the sixth embodiment may be combined with each other unless those exclude each other.

Further, from the above description, many modifications and other embodiments of the present disclosure are obvious for a person having ordinary skill in the art. Therefore, the above description should be construed as only examples and is provided for the purpose of teaching a person having ordinary skill in the art the best modes for carrying out the present disclosure. Details of structures and/or functions may substantially be changed without departing from the spirit of the present disclosure.

One aspect of the present disclosure provides a gas diffusion device in which a gas flow path may appropriately be provided to a metal plate without performing a grooving process and a bending process. Thus, one aspect of the present disclosure may be used for an electrochemical hydrogen pump, for example.

What is claimed is:

1. A gas diffusion device comprising:
a first gas diffusion layer that includes a first gas diffuser to diffuse gas and is formed of metal, the first gas diffusion layer having a first surface and a second surface opposite to the first surface;
a first metal plate that is provided on the first surface of the first gas diffusion layer and includes a first introduction manifold hole through which the gas flows and a first gas flow path that couples the first introduction manifold hole and the first gas diffuser, the first introduction manifold hole introducing the gas to the first gas flow path; and
a second metal plate that is provided on the second surface of the first gas diffusion layer and includes a second lead-out manifold hole through which gas flows and a second gas flow path that couples the first gas diffuser and the second lead-out manifold hole, the second lead-out manifold hole discharging the gas from the second gas flow path, wherein
the first gas flow path passes through the first metal plate, and the second gas flow path passes through the second metal plate.

2. The gas diffusion device according to claim 1, wherein the first metal plate has a first surface facing the first surface of the first gas diffusion layer and a second surface opposite to the first surface, and
the gas diffusion device further comprises a third metal plate disposed on the second surface of the first metal plate to cover an opening of the first gas flow path.

3. The gas diffusion device according to claim 1, wherein the first gas diffusion layer includes a laminated body of metal plates that have plural through holes.

4. The gas diffusion device according to claim 1, wherein the first gas diffusion layer includes a sintered metal body that diffuses gas.

5. The gas diffusion device according to claim 1, wherein the first metal plate includes a first lead-out manifold hole that communicates with the second lead-out manifold hole, and
the first gas flow path that is provided to the first metal plate does not communicate with the first lead-out manifold hole.

6. The gas diffusion device according to claim 1, wherein the second metal plate includes a second introduction manifold hole that communicates with the first introduction manifold hole, and
the second gas flow path that is provided to the second metal plate does not communicate with the second introduction manifold hole.

7. The gas diffusion device according to claim 1, wherein the second metal plate is provided with a second gas diffuser that diffuses the gas, the second gas diffuser being disposed in a region in which the second gas flow path is not provided.

8. The gas diffusion device according to claim 1, wherein the second metal plate has a first surface facing the second surface of the first gas diffusion layer and a second surface opposite to the first surface, and
the gas diffusion device further comprises a second gas diffusion layer that diffuses the gas, the second gas diffusion layer being disposed on the second surface of the second metal plate.

9. The gas diffusion device according to claim 8, wherein the second metal plate includes a second introduction manifold hole that communicates with the first introduction manifold hole, and
the second gas diffusion layer is provided with a third introduction manifold hole that communicates with the second introduction manifold hole and a third lead-out manifold hole that communicates with the second lead-out manifold hole.

10. The gas diffusion device according to claim 1, wherein the first gas flow path that is provided to the first metal plate includes plural parallel gas flow paths that communicate with the first introduction manifold hole, and
lengths of the plural parallel gas flow paths are different from each other.

11. The gas diffusion device according to claim 1, wherein the second gas flow path that is provided to the second metal plate includes plural parallel gas flow paths that communicate with the second lead-out manifold hole, and
lengths of the plural parallel gas flow paths are different from each other.

12. The gas diffusion device according to claim 1, wherein the first gas diffusion layer comprises a gas diffuser and a manifold hole through which the gas flows, wherein the gas diffuser and the manifold hole do not communicate with each other.

13. An electrochemical hydrogen pump comprising:
an electrolyte membrane that includes a pair of main surfaces;
a cathode catalyst layer that is provided to one main surface of the electrolyte membrane;
an anode catalyst layer that is provided to another main surface of the electrolyte membrane;
a cathode gas diffusion device that is provided to the cathode catalyst layer;
an anode gas diffusion device that is provided to the anode catalyst layer; and
a voltage applicator that applies a voltage between the cathode catalyst layer and the anode catalyst layer, wherein
the anode gas diffusion device includes the gas diffusion device according to claim 1.

* * * * *